Patented July 29, 1952

2,605,219

UNITED STATES PATENT OFFICE 2,605,219

PREPARATION OF RADIOACTIVE BROMINE

Homer Jacobson, New York, N. Y., assignor to the United States of America as represented by the United States Atomic Energy Commission No Drawing. Application September 28, 1949,
Serial No. 118,447

9 Claims. (Cl. 204—154)

This invention relates to the production of radioactive bromine and more particularly to a method for liberating bromine from a non-volatile bromide salt which has been irradiated in a neutronic reactor.

Radioactive bromine finds particular use in organic chemistry as a tracer and enters many organic reactions directly. It is prepared generally by irradiating natural bromine in a neutronic reactor. The inherent difficulty in this is the fact that the bromine itself is quite volatile and therefore cannot be irradiated easily in a neutronic reactor in the elemental state. Furthermore, in its elemental state, bromine is exceedingly corrosive thus making the handling of the radioactive element impracticable. In order to obviate these difficulties, the bromine is irradiated in the form of a non-volatile, extremely pure salt of a metal having a low capture cross section for neutrons. The salt most commonly used for this purpose is potassium bromide although other salts may be employed.

After the bromide salt has been irradiated the problem then arises of releasing the bromine from the salt in the extremely pure form which is required for tracer studies. Methods for releasing the bromine employing a solvent, such as water, are inherently troublesome for two reasons. The first is the problem of separating the solvent from the bromine and the second is the tendency of bromine to react with most of the commonly used solvents. Another method which is suggested is the direct replacement of the bromine with elemental chlorine. This again has the inherent disadvantages of requiring a separation between chlorine and bromine as well as requiring special apparatus and techniques for handling the chlorine.

Accordingly, one of the objects of this invention is to provide a method of preparing elemental radioactive bromine.

A somewhat more specific object is to provide a method for releasing radio-bromine from a bromide salt which has been irradiated in a neutronic reactor.

Another object of the invention is to provide a method for increasing the concentration of radioactive bromine in a sample of the naturally occurring element.

Other objects of this invention will be in part apparent and in part pointed out hereinafter.

In accordance with this invention a non-volatile bromide salt containing active bromine is mixed with an anhydrous, relatively volatile metal bromide which is capable of ionizing in the molten state. The relatively volatile bromide salt is heated above its fusion point to a temperature sufficient to vaporize a portion of it and the vapor of this salt is then brought into contact with natural bromine gas. Thereafter the bromine gas is separated from the vapor of the metal bromide.

The present method employs what is apparently two exchange reactions, one between the non-volatile and the relatively volatile salts in which the active bromine is transferred to the volatile salt and the other between the vapor of the volatile bromide salt and the natural bromine gas to transfer the active bromine to the bromine gas. By carrying out these reactions under anhydrous conditions and with pure materials the bromine gas which contains the active isotopes is obtained in an extremely pure form. Should any of the vapor of the volatile bromide become entrained in the bromine gas, it may be easily separated by condensation.

The following examples are presented to illustrate the method of this invention and it should be understood that they are illustrative only and are not intended as a limitation on the invention.

Example 1

One milligram of potassium bromide was mixed with about 50 milligrams of pure, anhydrous aluminum bromide. The potassium bromide had been irradiated in a neutronic reactor and it contained about 2 microcuries of activity as bromine-82. The mixed salts were placed in a vessel which was then sealed to the atmosphere and evacuated to about $10^{-3}$ millimeters of mercury. The aluminum bromide was heated above its melting point which is about 98° C. to a temperature of around 200° C. Thereafter, about 5 grams of gaseous bromine were admitted to the sealed vessel. After a period of time the aluminum bromide was permitted to cool and its vapor to condense, and the bromine was withdrawn. The steps of vaporizing a portion of the aluminum bromide and bringing the vapor into contact with the sample of bromine were repeated until equilibrium was reached. The product bromine was counted and found to contain about 80 to 90% of the activity originally in the potassium bromide, that is, the bromine contained just less than 0.4 microcurie per gram.

Example 2

Forty milligrams containing 50 microcuries of radio-bromine in potassium bromide were treated as described in Example 1 with 200 milligrams of anhydrous aluminum bromide. About 2 milliliters of liquid bromine were brought into contact with the aluminum bromide, the bromine being in the vapor state. There were recovered 30 microcuries of the bromine-82 in the bromine treated.

*Example 3*

About 50 milligrams of potassium bromide containing about 0.12 millicurie were treated as in Example 1 with about 200 milligrams of aluminum bromide and about 5 grams of bromine. About 70–80% of the activity originally in the potassium bromide was recovered in the bromine so treated.

It was noted in carrying out the procedures of Examples 2 and 3 that a relatively large number of vaporizations of the aluminum bromide and contacts with bromine were required. The reason for this is the relatively low weight ratio of aluminum bromide to potassium bromide. Accordingly, it is recommended that a ratio of at least 10:1 by weight be employed in the case of aluminum bromide and potassium bromide or, in general, a molar ratio between the volatile and non-volatile bromides of at least 4.5:1.

It will be evident from the foregoing examples that the present invention provides an extremely simple and inexpensive method of preparing anhydrous active bromine. Little or no special equipment is required for carrying out the reaction and it is unnecessary to carry out further purification of the bromine gas obtained. This is in contrast to some of the methods mentioned hereinbefore where a substantial amount of purification would be required in order to separate the bromine gas in a pure form. It is obvious also that the temperatures at which the method can be carried out, that is, around 200 to 300° C. are particularly advantageous since readily available glass or glass lined equipment can be used. This again permits the highest purity to be maintained.

It is desirable in carrying out the present process to permit the volatile metal bromide salt to solidify before removing the active gaseous bromine since this prevents any possible entrainment of the bromide vapor in the bromine gas. The reaction may also be carried in a continuous manner by flowing the bromine gas over the molten volatile bromide salt containing the non-volatile bromide salt. Other metal compounds are also useful in this process, for example, bromides of other alkali metals or of alkaline earth metals of low neutron capture cross-section may be substituted for the potassium bromide. Similarly, other volatile metal bromides may be used in the place of aluminum bromide, for example, anhydrous stannic or zinc bromide. Other alternatives will be apparent to those skilled in the art.

Since many embodiments might be made of the present invention and since many changes might be made in the embodiment described, it is to be understood that the foregoing description is to be interpreted as illustrative only and not in a limiting sense.

I claim:

1. A method of preparing active bromine gas from a non-volatile bromide salt containing active bromine which comprises mixing said salt with an anhydrous, relatively volatile metal bromide which ionizes in the molten state, fusing said volatile metal bromide at a temperature sufficient to vaporize a portion thereof, bringing the vaporized bromide into contact with natural bromine gas and separating the bromine gas.

2. A method of preparing radioactive bromine gas which comprises irradiating a non-volatile, anhydrous bromide salt with neutrons, the bromide salt consisting of bromine and a metal having a low capture cross-section for neutrons, mixing the irradiated salt with an anhydrous, relatively volatile metal bromide which ionizes in the molten state, fusing the last said metal bromide at a temperature sufficient to vaporize a portion thereof, bringing the vaporized bromide into contact with natural bromine gas and separating the bromine gas.

3. A method of preparing active bromine gas from a non-volatile bromide salt containing active bromine which comprises mixing said salt with aluminum bromide, fusing said aluminum bromide at a temperature sufficient to vaporize a portion thereof, bringing the vaporized bromide into contact with natural bromine gas and separating the bromine gas.

4. A method of preparing active bromine gas from a non-volatile bromide salt containing active bromine which comprises mixing said salt with stannic bromide, fusing said stannic bromide at a temperature sufficient to vaporize a portion thereof, bringing the vaporized bromide into contact with natural bromine gas and separating the bromine gas.

5. A method of preparing active bromine gas from a non-volatile bromide salt containing active bromine which comprises mixing said salt with zinc bromide, fusing said zinc bromide at a temperature sufficient to vaporize a portion thereof, bringing the vaporized bromide into contact with natural bromine gas and separating the bromine gas.

6. A method of preparing active bromine gas which comprises irradiating an anhydrous, non-volatile bromide salt with neutrons, said bromide salt consisting of bromine and a metal having a low capture cross section for the neutrons, mixing the irradiated salt with anhydrous aluminum bromide, fusing said aluminum bromide at a temperature sufficient to vaporize a portion thereof, bringing the vaporized bromide into contact with natural bromine gas and separating the bromine gas.

7. A method of liberating active bromine from potassium bromide containing the same which comprises mixing the potassium bromide with an anhydrous, relatively volatile metal bromide which ionizes in the molten state, fusing said volatile metal bromide at a temperature sufficient to vaporize a portion thereof, bringing the vaporized bromide into contact with natural bromine gas and separating the bromine gas.

8. A method of preparing active bromine which comprises irradiating potassium bromide with neutrons, mixing the irradiated bromide with at least ten times its weight of anhydrous aluminum bromide, fusing the aluminum bromide at a temperature sufficient to vaporize a portion thereof, bringing the vaporized bromide into contact with natural bromine gas and separating the bromine gas.

9. A method of preparing active bromine which comprises irradiating potassium bromide with neutrons, mixing the irradiated bromide with at least ten times its weight of anhydrous aluminum bromide, fusing the aluminum bromide at a temperature in the range 200 to 300° C., bringing the vaporized bromide into contact with natural bromine gas and separating the bromine gas.

HOMER JACOBSON.

REFERENCES CITED

The following references are of record in the file of this patent:

Nature, volume 145 (1940), page 307.
Pollard and Davidson, "Applied Nuclear Physics," John Wiley (1942), pages 141 and 142.
Seren et al., Physical Review, volume 72 (1947), pp. 888–901.
Chemical Abstracts 42 (1948), pp. 51 and 52 (Abstracts of Kryagova publication and Shvedov publication.)
Richter, MDDC-785, "Studies in the Preparation of Organic Radio—Halides," U. S. A. E. C., 37 pages, date of manuscript November 1, 1946; date declassified March 18, 1947.